(12) United States Patent
Nurmela (10) Patent No.: US 7,234,166 B2
(45) Date of Patent: Jun. 19, 2007

(54) EVENT SEQUENCE DETECTION

(75) Inventor: Kari Nurmela, Espoo (FI)

(73) Assignee: Stonesoft Corporation, Helsinki (FI)

( * ) Notice: Subject to any disclaimer, the term of this patent is extended or adjusted under 35 U.S.C. 154(b) by 843 days.

(21) Appl. No.: 10/289,449

(22) Filed: Nov. 7, 2002

(65) Prior Publication Data

US 2004/0093510 A1 May 13, 2004

(51) Int. Cl.
 *G06F 12/14* (2006.01)
(52) U.S. Cl. .......................... 726/23; 726/22
(58) Field of Classification Search .................. 726/23, 726/22; 714/39
 See application file for complete search history.

(56) References Cited

U.S. PATENT DOCUMENTS

| | | | | |
|---|---|---|---|---|
| 6,370,648 | B1 * | 4/2002 | Diep | 726/22 |
| 7,032,114 | B1 * | 4/2006 | Moran | 713/187 |
| 2002/0078381 | A1 | 6/2002 | Farley et al. | |

OTHER PUBLICATIONS

Koral Ilgun et al., "State Transition Analysis: A Rule-Based Intrusion Detection Approach," IEEE Transactions on Software Engineering, IEEE (New York), vol. 21 (No. 3), p. 181-199, (Mar. 21, 1995).

Noelle McAuliffe et al., "Is Your Computer Being Misused? A Survey of Current Intrusion Detection System Technology," Proc., Computer Security Applications Conference, IEEE, p. 260-272, (Dec. 3, 1990).

Herve Debar et al., "Towards a taxonomy of intrusion-detection systems," Computer Networks, Elsevier Science Publishers B.V. (Amsterdam, NL), vol. 31 (No. 8), p. 805-822, ( Apr. 23, 1999).

* cited by examiner

*Primary Examiner*—Kambiz Zand
*Assistant Examiner*—Ellen C. Tran
(74) *Attorney, Agent, or Firm*—Barnes & Thornburg LLP (57) ABSTRACT

The invention relates to event sequence detection suitable for an intrusion detection system (IDS), for example. An event sequence including two or more stages in order, each of the stages including one or more events, is defined. Also defined is a filtering function for each of the stages, each filtering function providing a TRUE indication, when one of the events belonging to the respective event is received, and a FALSE indication otherwise. Still further at least one binding function for each of the stages is defined such that a pair of binding functions in two successive stages links the events in these two successive stages. Received event data is continuously evaluated with the filtering functions. When the evaluation results in a TRUE indication from one of the filter functions, at least one key value is derived from the received event data by the corresponding at least one binding function. Finally, it is determined that that the sequence has been detected, when a TRUE indication has been obtained in each stage in a timely order and the derived key values link the detected events in the successive stages.

21 Claims, 2 Drawing Sheets

EVENT SEQUENCE DETECTION

FIELD OF THE INVENTION

The present invention relates to event sequence detection for example in an intrusion detection system (IDS).

BACKGROUND OF THE INVENTION

Intrusion detection system (IDS) is a type of security management system for computers and networks. An IDS system gathers and analyzes information from various areas within a computer or a network to identify possible security breaches, which include both intrusions (attacks from outside the organization) and misuse (attacks from within the organization). ID uses vulnerability assessment (sometimes referred to as scanning), which is a technology developed to assess the security of a computer system or network.

Intrusion detection functions include:
Monitoring and analyzing both user and system activities,
Analyzing system configurations and vulnerabilities,
Assessing system and file integrity,
Ability to recognize patterns typical of attacks,
Analysis of abnormal activity patterns, and
Tracking user policy violations.

An IDS system is configured to generate an alarm, when an event, which is considered to be malicious, is detected. In order to decrease the amount of false positives in the event detection, correlation of the events may be taken into account. That is, also the context in which an event is detected may have an effect on whether the event is classified suspicious or not.

U.S. Patent Application 2002/0078381, "Method and System for Managing Computer Security Information", presents one solution for realtime event sequence detection. Therein, a fusion engine "fuses" event information from multiple data sources and analyzes this information in order to detect relationships between the events that may indicate malicious behavior. According to the method presented, event data are classified into different event type categories and a ranking is assigned to each event. Then relationships between events are identified and on the basis of the relationships a mature correlation event, indicating that malicious behavior has been detected, is generated. Nevertheless, the document does not teach a specific technique for identifying the relationships nor does it provide effective way to implement event sequence detection.

SUMMARY OF THE INVENTION

Object of the invention is to provide another solution for detecting event sequences in the context of identifying intrusion attempts.

This is achieved with an invention defined in the attached independent claims. Embodiments of the invention are defined in the dependent claims.

The idea of the invention is to identify event sequences by detecting a common parameter in two or more events.

An aspect of the invention is an event sequence detection method, comprising defining an event sequence including two or more stages in order, each of the stages including one or more events, defining a filtering function for each of said stages, each filtering function providing a TRUE indication, when one of the events belonging to the respective event is received, and a FALSE indication otherwise, defining at least one binding function for each of the stages such that a pair of binding functions in two successive stages links the events in these two successive stages, continuously receiving event data, continuously evaluating the received event data with the filtering functions, when the evaluation results in a TRUE indication from one of the filter functions, deriving at least one key value from the received event data by the corresponding at least one binding function, determining that said sequence has been detected, when a TRUE indication has been obtained in each stage in a timely order and the derived key values link the detected events in the successive stages.

Another aspect of the invention is an event sequence detection method, comprising defining an event sequence including two or more stages in order, each of the stages including one or more events, defining a filtering function for each of said stages, each filtering function providing a TRUE indication, when one of the events belonging to the respective event is received, and a FALSE indication otherwise, evaluating the filtering functions with the event data, if the filtering function of the one of the stages evaluates to TRUE, a binding function associated with the respective stage is evaluated for extracting a first key from the event data, if the stage, which evaluates to TRUE, is the first stage, it is checked whether the event and the first key already exist in a table associated with the first stage, and the if checking result is negative, the event and the first key are added to the table, if the stage, which evaluates to TRUE, is some other than the first stage, it is checked, whether there is an entry with the first key in the table of the previous stage, if the checking result is negative, nothing is done, and if the checking result is confirmative, another binding function associated with the current stage is evaluated for extracting a second key from the event data and the table associated with the current stage is checked for whether the event and the second key do exist in the table, and if the latter checking result is negative, the event and the second key are added to the table, if the stage, which evaluates to TRUE, is the last stage, it is checked, whether there is an entry with the first key in the table of the previous stage, and if the checking result is negative, nothing is done, and if the checking result is confirmative, it is determined that a sequence of events has been detected.

A further aspect of the invention is an event sequence detection method, comprising defining an event sequence including two or more events, defining a filtering function and an associated binding function for each event, each filtering function providing a TRUE indication, when the respective event is received, and a FALSE indication otherwise, continuously receiving event data, continuously evaluating the received event data with the filtering functions, each time when the evaluation results in a TRUE indication from one of the filter functions, registering the corresponding event and a key value derived from the received event data by the corresponding binding function, determining the event sequence as detected, if all events of the event sequence with mutually matching key values are registered.

A further aspect of the invention is an event sequence detection method, comprising defining an event sequence including two or more stages, each of the stages including one or more events, defining a filtering function for each of said stages, each filtering function providing a TRUE indication, when one of the events belonging to the respective event is received, and a FALSE indication otherwise, evaluating the filtering functions with the event data, if the filtering function of the one of the stages evaluates to TRUE, a binding function associated with the respective stage is evaluated for extracting a key from the event data, checking whether the key already exists in a table associated with the set of stages, if the key is not found in the table, the event with the key is added to the table, if the key is found in the table, it is checked whether an event for the current stage is already recorded for the key, if no event for the current stage is already recorded for the key, the event is added to the table in connection with the key and the current stage, checking whether the key has an event recorded for each stage, and if the key has an event recorded for each stage, determining that the event sequence has been detected.

A further aspect of the invention is an event sequence detection method, comprising defining an event sequence including two or more stages, each of the stages including one or more events, defining a filtering function for each of said stages, each filtering function providing a TRUE indication, when one of the events belonging to the respective event is received, and a FALSE indication otherwise, evaluating the filtering functions with the event data, if the filtering function of the one of the stages evaluates to TRUE, a binding function associated with the respective stage is evaluated for extracting a key from the event data, checking whether the key already exists in a table associated with the set of stages, if the key is not found in the table, the event with the key is added to the table, if the key is found in the table, it is checked whether an event for the current stage is already recorded for the key, if no event for the current stage is already recorded for the key, the event is added to the table in connection with the key and the current stage, if an event for the current stage is already recorded for the key, incrementing the number of events with this key and stage, checking whether the key has a predetermined number of events recorded for each stage, and if the key has a predetermined number of events recorded for each stage, determining that the event sequence has been detected.

A further aspect of the invention is an event sequence detector block for execution by a processor in a data communications network environment, comprising:

a computer readable memory, and a routine stored on a the computer readable memory and adapted to be implemented on the processor, wherein the routine:

has a predefined event sequence including two or more stages in order, each of the stages including one or more events, has a predefined filtering function for each of said stages, each filtering function providing a TRUE indication, when one of the events belonging to the respective event is received, and a FALSE indication otherwise, has at least one predefined binding function for each of the stages such that a pair of binding functions in two successive stages links the events in these two successive stages, continuously receives event data, continuously evaluates the received event data with the filtering functions, when the evaluation results in a TRUE indication from one of the filter functions, derives at least one key value from the received event data by the corresponding at least one binding function, determines that said sequence has been detected, when a TRUE indication has been obtained in each stage in a timely order and the derived key values link the detected events in the successive stages.

A further aspect of the invention is an event sequence detector block for execution by a processor in a data communications network environment, comprising:

a computer readable memory, and a routine stored on a the computer readable memory and adapted to be implemented on the processor, wherein the routine:

has a predefined event sequence including two or more events, has a predefined filtering function and an associated binding function for each event, each filtering function providing a TRUE indication, when the respective event is received, and a FALSE indication otherwise, continuously receives event data, continuously evaluates the received event data with the filtering functions, each time when the evaluation results in a TRUE indication from one of the filter functions, registers the corresponding event and a key value derived from the received event data by the corresponding binding function, determines the event sequence as detected, if all events of the event sequence with mutually matching key values are registered.

A further aspect of the invention is a computer readable storage medium comprising a computer program that carries out any one of the methods of the invention when executed by a computer.

A further aspect of the invention is a computer program that carries out any one of the methods of the invention when executed by a computer.

DETAILED DESCRIPTION

The present invention may be embodied in program modules that run in a computing device, such as on a workstation, a personal computer, a server, or a special purpose appliance, having a processor and a memory and being connected to a data network or system to be monitored. The data network may be a fixed line network or a wireless network. The present invention may be embodied as a part of an intrusion detection system (IDS).

Figure 1:
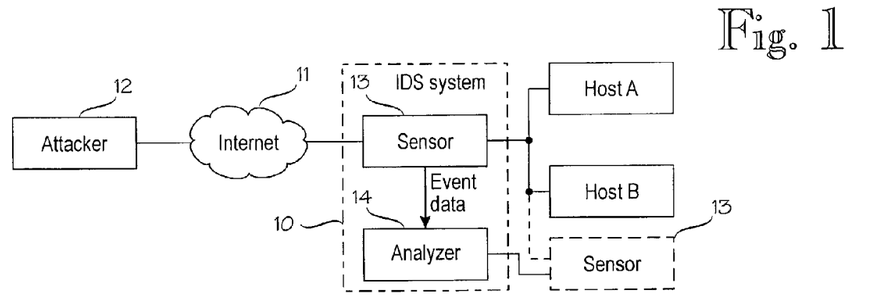
FIG. 1 shows an illustrative operating environment for an IDS system.

Intrusion detection system (IDS) is a type of security management system for computers and networks. An IDS system gathers and analyzes information from various areas within a computer or a network to identify possible security breaches, which include both intrusions (attacks from outside the organization) and misuse (attacks from within the organization). An illustrative operating environment for an IDS system in a very simplified configuration is shown in FIG. 1. The IDS system 10 is providing security functions for host servers A and B within a local network of the organization. An attacker 12 located outside the organization attempts to attack to the host A or B over the Internet 11. The IDS system may include one or more sensors 13 that notify when significant events occur that relate to the sensor's operation. The sensors can be located at any locations in the network where the system operation and traffic shall be monitored. There may various types of events that may be reported by the sensor. The events may include status messages about normal system operation. The events may also include various error and warning messages. Examples of suitable sensors include RealSecure Network Sensor 6.5 and 7.0 from Internet Security Systems Inc (ISS), Atlanta, Ga. It should be appreciated, however, that the details of the sensors, or other sources of the event data, and the specific type of the event data applied by the present invention are not essential to the present invention. It is only necessary that event data is available for the event sequence detection according to the invention.

The IDS system may further include an analyzer or detector 14 that may contain the event sequence detection according to the invention. The analyzer 14 may be located on the workstation or the console of the network security personnel, for example, or alternatively at any other device or location in the network. The IDS system may further include several analysers.

An IDS system is configured to generate an alarm, when an event, which is considered to be malicious, is detected. In order to decrease the amount of false positives in the event detection, correlation of the events may be taken into account. That is, also the context in which an event is detected may have an effect on whether the event is classified suspicious or not. Event sequence detection is an important tool when trying to find out whether an attack was successful or not, and in detecting complex attack scenarios.

Event Sequence Detection

This section gives a formal definition of an event sequence detection according to the present invention.

The analyzer 14 receives event data or, more generally, events. Events may be received from multiple sources, such as the sensors 13. These events can contain arbitrary data, for example timestamp of the event, the situation identifier that caused generating that event record, etc. Let the sequence of events received by the analyzer 14 be E.

In accordance with the present invention, a set of filters (denoted by $f_1, f_2, \ldots$) is provided. The filters are computable functions whose domain is the set of all events e and the range is the set {TRUE,FALSE}. That is, for each event $e \in E$ a filter $f$ evaluates to TRUE, denoted by $f(e)$=TRUE, (i.e. the event can pass through the filter), or to FALSE, denoted by $f(e)$=FALSE (i.e. the event is blocked by the filter). In principle a filtering function checks, if some parts of the event data match to the values or value ranges set for the function. In general level, a filtering function may be a rule to which event data is compared.

The time information, such as a timestamp of an event e is denoted by $t(e)$. For simplicity we assume that the events are received in the order defined by their timestamps or other time information. Below will be described an embodiment that processes the events in the order of receiving, neglecting the timestamps. However, in a further embodiment the analyzer can be used to sort the events in the order of increasing timestamps, if they are received in a slightly permuted order.

The last concept needed to define the event sequence detection according to the present invention is a binding function. Binding functions are denoted by $b_{x,y}^x$ or $b_{x,y}^y$, where x and y are positive integers and x<y. For any pair of events in the sequence, x stands for an earlier event and y for the later event (or stage as described in some embodiments below). In a special case used in the embodiments and examples below, for each binding function, it is required that x=n−1 and y=n. This means that the binding functions link two immediately consecutive events or stages. The domain of a binding function is the set of events and the range of a binding function is the set of sequences of octets (or bytes), derived or extracted or computed from the argument event. In principle, a binding function is used for finding event data pairs for which some part of a first event data has the same value than some other part of a second event data. More than one part of event data can be included in one binding function, and the parts, which are checked, may as well be the same in both events.

According to an embodiment of the present invention, an event sequence of n events is detected from the received events if and only if there exist events $e_1, e_2, \ldots, e_n \in E$ such that all the following conditions are fulfilled:

$$t(e_1) < t(e_2) < \ldots < t(e_n)$$

$$f_1(e_1) = f_2(e_2) = \ldots = f_n(e_n) = \text{TRUE}$$

$$b_{1,2}^1(e_1) = b_{1,2}^2(e_2),\ b_{2,3}^2(e_2) = b_{2,3}^3(e_3),\ \ldots,$$

AND $$b_{n-1,n}^{n-1}(e_{n-1}) = b_{n-1,n}^n(e_n)$$

$$t(e_n) - t(e_1) \leq \text{TIME WINDOW SIZE}$$

In this embodiment the binding functions links two consecutive events or stages. For example, the binding functions $b_{1,2}^1(e_1) = b_{1,2}^2(e_2)$ are linking the first (x=1) and second (y=2) events or stages. Similarly, the binding functions $b_{2,3}^2(e_2) = b_{2,3}^3(e_3)$ are linking the second (x=2) and the third (y=3) events or stages. Thus, the intermediate events or stages have two binding functions, one for an earlier event or stage and one for later event or stage.

It is also possible to allow more general binding function conditions, but then the implementation will be more complex and the processing slower than the one required for the embodiment described above. An example of more general binding function conditions is that the binding function is linking also other than immediately neighbouring events or stages. For example, $b_{1,3}^1(e_1) = b_{1,3}^3(e_3)$ links events or stages 1 and 3.

Event Group Detection

If the events can arrive slightly out of order, and there is no reliable time stamp information available, the previously described method of detecting event sequences becomes less useful. Alternatively, it is possible that the order of the events may be irrelevant form the analyser point of view. In the following it is illustrated how to detect unordered event groups by modifying some parts of the event sequence detection algorithm described above. In an embodiment of the invention, we can modify the sequence detection conditions described above as follows:

An event group of n events is detected from the received events if, and only if, there exist events $e_1, e_2, \ldots, e_n \in E$ such that all the following conditions are fulfilled:

$$f_1(e_1)=f_2(e_2)=\ldots=f_n(e_n)=\text{TRUE}$$

$$b_1(e_1)=b_2(e_2)=\ldots=b_n(e_n)$$

all the events $e_1, e_2, \ldots, e_n$ have been received within a configurable time window Here the binding function definition is simpler, because we no more need to link two successive events but rather find a common part of all events of the group.

In the implementation level, instead of having a hash table for each stage, we can now have a single hash table, whose key is the common binding function value. The entries in the hash table have event references and expiration information. When an entry becomes "full" (it has one event reference for each filter), a group has been detected.

Event Filter Expressions

The following is an illustration of exemplary event filter expressions that can be used in the embodiments and examples described below. In these examples, event filter expressions (EFEs) are used both as filters and binding functions.

In these examples, event records may consist of log names and associated values. Each event may give zero or more values to each log name. Each log name may have a fixed type. Log names may be integers, but in this description we use symbolic names starting with LN_.

When an event filter expression is evaluated in the context of an event, the values of the log names in the event are investigated and the value of the event filter expression is evaluated. For example, an event can contain following log names and their values:

| Event 1: | |
|---|---|
| log name | Value |
| LN_SITUATION_ID | 999 |
| LN_SITUATION_STRING | "Too long SMTP command was detected" |
| LN_IPV4_DESTINATION | 10.0.0.1 |

Now, for example, the following event filter expressions could be evaluated in the context of Event 1:

| EFE | EFE(Event 1) |
|---|---|
| defined(LN_SITUATION) | TRUE |
| defined(LN_SOME_OTHER) | FALSE |
| LN_IPV4_DESTINATION & 255.255.255.0 | 10.0.0.0 |
| LN_SITUATION_ID == 999 | TRUE |

Event Filter Expression Syntax

An event filter expression may present a combination of logical statements concerning a single event, which can be evaluated to be either true or false. The statements may refer to the symbolic log names that are present in the event. The log names may present either the value assigned to them in the event or just a logical value whether the particular log name is present in the event. A number of operations may be available to values, both log name references and literal, of different types. The expressions can also be grouped with parentheses.

The supported types may include one or more of the following:
bool, for Boolean logical value
int32, for 32-bit integer
int64, for 64-bit integer
float, for single precision floating point number
double, for double precision floating point number
string, for a string of characters The available operations are:
defined(log name), returns true if the log name is present in the event.
(expr), parentheses for expression grouping
<,>,>=,<=,==,!=, gives logical value of numeric or alphabetical relation
!, logical not negates value of logical expression
&&, ||, -->, logical and, or, and implication operations return Boolean value
log_name, returns value assigned to the log name in the event
literal, literal numeric (integer or floating point) or string value
unary -, negates numeric parameter value
+,-,*,/,**, add, subtract, multiply, divide, and raise to power, to numeric values
&,|,^,<<,>>bitwise and, or, xor, and shift operations for integer types NTP [RFC 1305, 2030] time stamp functions.
time( ), returns current NTP-stamp
get_year(int64), returns year of NTP stamp given as parameter.
get_month(int64), returns number of month (0-11) of NTP stamp given as parameter.
get_wday(int64), returns number of week day (0-6, 0=sunday) of NTP stamp given as parameter.
get_mday(int64), returns day of month (1-31) of NTP stamp given as parameter.
get_yday(int64), returns number of day of year (0-365) of NTP stamp given as parameter.
day_time(int64) Without parameter, current time is taken as parameter.
Literal NTP stamp value can be expressed in format YYYYMMDD.hh:mm:ss.s, for example 20020729.15: 17:27.123, means Jul. 29 15:17 27.123s 2002 in local time zone.

Some log names may be allowed to occur more than once in single event, two special functions are meant to handle these cases. The relational expression given as parameter to these functions may be of form LOG_NAME relational_operator_literal expression, where relational expression may be one of <,>,>=,<=,==,!= and the log name may be of same type as the literal expression. For example: for_all(NUMERIC_LOG_NAME<1+2+3).
for_all(relational expression), returns true if the relational expression is true for all occurrences of log name present in relational expression.
for_any(relational expression), returns true if the relational expression is true for any occurrence of log name present in relational expression.

FURTHER EMBODIMENTS

Two illustrative further embodiments implementing the invention are presented below. In the first embodiment shown in FIG. 2 it is assumed that the events are processed in the order they have happened. The events can be processed in the order they are received, or they can be sorted in the order of increasing time stamps before processing. In the latter, second, embodiment shown in FIG. 3, the order in which events arrive does not matter, as long as the events arrive sufficiently close to each other. In the second embodiment the events can be processed in whatever order. In addition, both embodiments may comprise a predefined time window. In that case events are considered to be part of the same set (or sequence) of events only if they are received within the predefined time-window.

Figure 2:
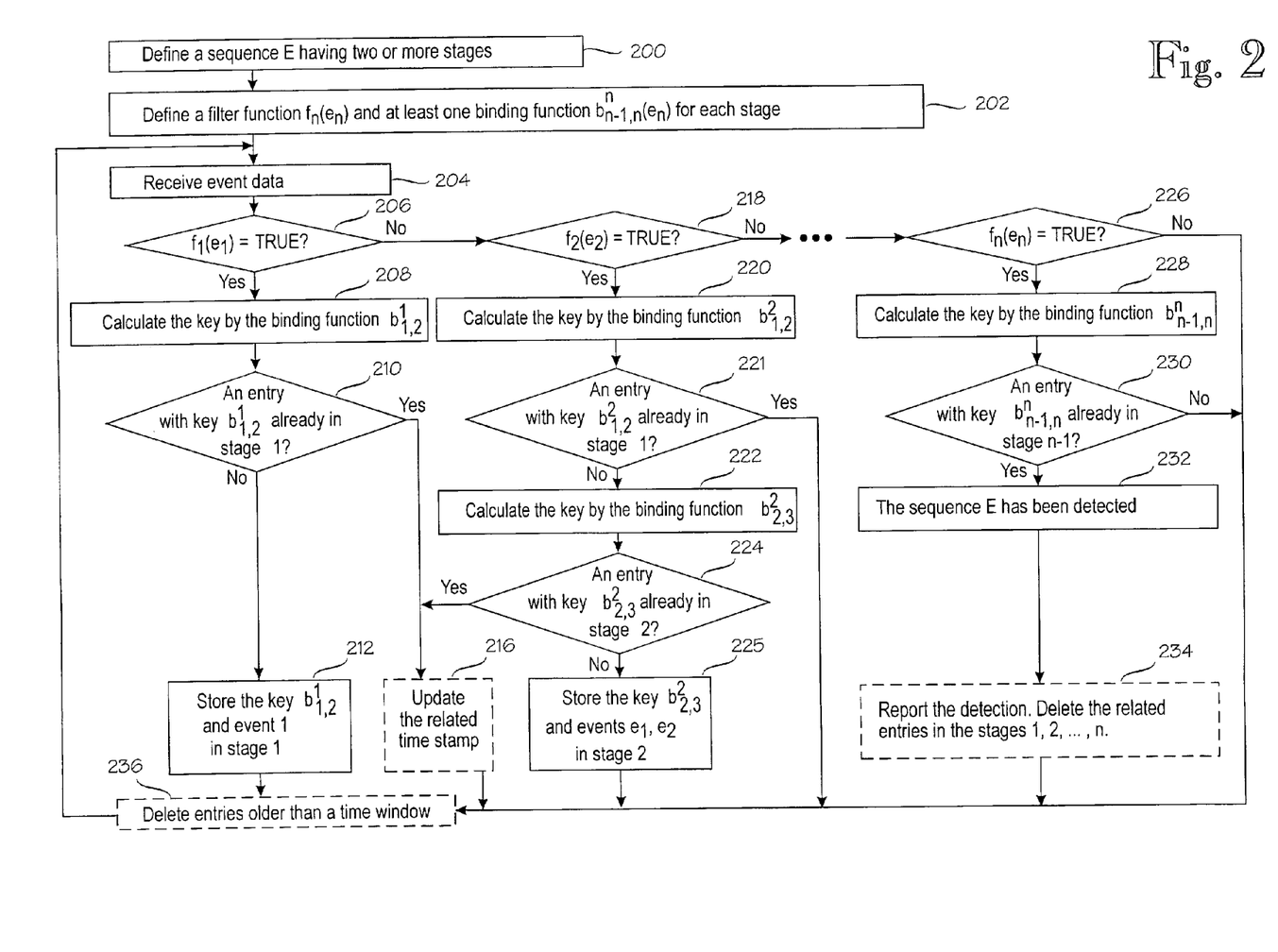
FIG. 2 is a flow diagram illustrating an event sequence detection according to an embodiment of the invention.

Referring now to FIG. 2, in the first embodiment two or more stages (step 200) and a filtering function (e.g. rule) for each of them (step 202) are defined. Processing of an event goes as follows:

The filtering functions are evaluated with the received (step 204) event data (e.g. event data is compared to the filtering rules), in steps 206, 218 and 226.

If the filtering function of the one of the stages evaluates to TRUE (e.g. event data matches filtering rule of one of the stages) in the step 206, 218 or 226, a binding function associated with the respective stage is evaluated for extracting/deriving a first key from the event data (step 208, 220 or 228, respectively).

If the stage, which evaluates to TRUE, is the first stage (the step 206), it is checked if the event and the first key already exist in a table associated with the first stage (step 210). If not, the event and the first key are added to the table (step 212). If yes, a timestamp of the event may be updated in the table (step 216, and then the process proceeds to step 236). Otherwise (i.e. if the time stamp is not in use or not updated), nothing needs to be done (the process proceeds directly to step 236).

If the stage, which evaluates to TRUE, is some other than the first stage or the last stage (step 218), it is checked, if there is an entry with the first key in the table of the previous stage (step 221). If not, nothing is done (the process proceeds to the step 236). If yes, another binding function associated with the current stage is evaluated for extracting a second key from the event data (step 222). Then, the table associated with the current stage is checked (224). If the event and the second key do not exist in the table, the event and the second key are added to the table (225). If the event and the second key already exist in the table, a timestamp of the event may be updated in the table (step 216). Otherwise, nothing needs to be done (the process proceeds directly to the step 236).

If the stage, which evaluates to TRUE, is the last stage (the step 226), it is checked, if there is an entry with the first key in the table of the previous stage (step 30). If not, nothing is done (the process proceeds directly to the step 236). If yes, it is determined that a sequence of events has been detected (step 232). Further, the detection may be reported and/or the related entries in the stages 1–3 be deleted (step 234)

In an embodiment of the invention, if several stages evaluate to TRUE, all such stages are processed. The processing can be arranged in ascending or descending order of the stages. If the stages are processed in ascending order, a single event can practically occur multiple times in the detected sequence (that is, a single event can evaluate to TRUE in first, second, third and so on stages of one sequence). The configuration of the stages (filtering and binding functions) naturally dictates, if this is possible in reality. If the stages are processed in descending order, all events in a detected sequence are distinct.

Finally, the entries older than the time window may be deleted (step 236).

Figure 3:
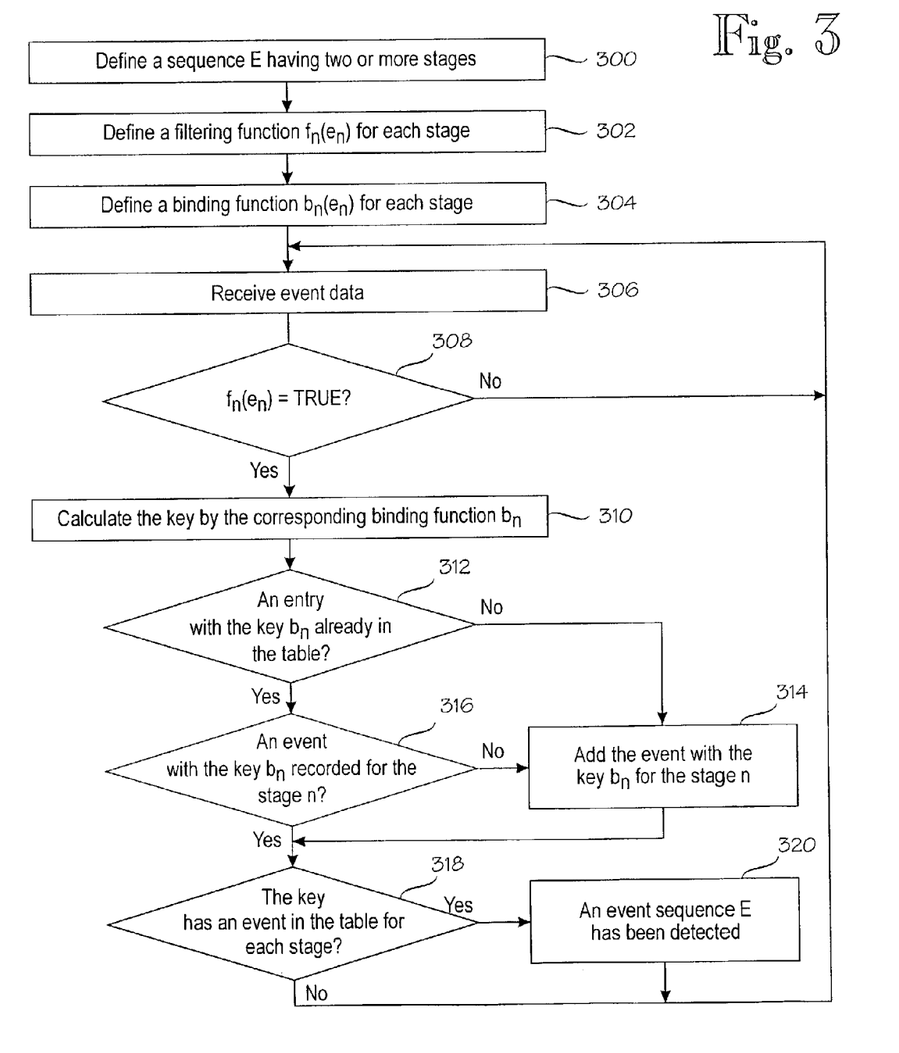
FIG. 3 is a flow diagram illustrating an event sequence detection according to another embodiment of the invention.

According the second embodiment shown in FIG. 3, two or more stages (step 300) and a filtering function (rule) for each of them (steps 302 and 304) are also defined. Processing of an event goes as follows:

The filtering functions are evaluated with the received (step 306) event data (i.e. event data is compared to the filtering rules) in step 308.

If the filtering function of a stage evaluates to TRUE (i.e. event data matches filtering rule of one of the stages), a binding function associated with the stage is evaluated for extracting a key from the event data (step 310).

A table associated with the set of stages is checked (step 312). If the key is not found in the table, the event with the key is added to the table (step 314).

If the key is found in the table, it is checked if an event for the current stage is recorded for the key (step 316). If yes, nothing needs to be done, and the process proceeds to step 318 (or alternatively, if it is defined that more than one event for each stage is required, the number of events with this key and stage is incremented). If not, the event is added to the table in connection with the key (step 314).

Then it is checked if the key has an event (or alternatively, a predefined number of events) recorded for each stage (step 318),and if yes, it is determined that a set of events has been detected (step 320).

In the above embodiments there is one or two binding functions for each stage. However, any number of binding functions per stage is possible in all embodiments of the invention. Naturally, also any number of different sets of stages can be defined in accordance with the present invention.

EXAMPLE

Let us now study a illustrative, fictitious example of the event sequence detection according to the invention. Let us assume that, in the network environment shown in FIG. 1, we try to detect a sequence, where 1. An attacker uses an overly long SMTP command to make a buffer overflow attack to gain root access to a host A.

2. Another connection to the SMTP server on host A is not accepted, because the attacker replaced the server by a program supplied by the attacker.

3. An unauthorized connection attempt is made from a host B belonging to the same (class D) subnet as host A.

This sequence mimics a scenario where the attacker manages to gain a root access to a host by overflowing an SMTP server buffer. However, the server remains non-functional after the overflow and any further connections are rejected. The attacker then manages to use local user information to log on another host within the same LAN and then tries to open an outbound connection that should normally not happen.

This sequence has 3 stages and to detect all such sequences on-the-fly, we have to store some information of prefixes, i.e. partial sequences, that can later, with additional events, form complete sequences as will be explained below.

The filters and binding functions to detect this kind of sequence could be defined as follows:

$f_1$: LN_SITUATION_ID==999 ("too long SMTP command")

$f_2$: LN_SITUATION_ID==998 ("connection refused") && LN_PORT_DESTINATION==25 (port of SMTP server)

$f_3$: LN_SITUATION_ID=997 ("attempted unauthorized connection")
$b_{1,2}^1$: LN_IPV4_DESTINATION
$b_{1,2}^2$: LN_IPV4_DESTINATION
$b_{2,3}^2$: LN_IPV4_DESTINATION & 255.255.255.0 (compute the subnet of the destination IP address)
$b_{2,3}^3$: LN_IPV4_SOURCE & 255.255.255.0

Assume that the following events are received (all in increasing timestamp order and within the configurable time window size):

| log name | Value |
|---|---|
| | Event 1: |
| LN_SITUATION_ID | 999 |
| LN_SITUATION_STRING | "Too long SMTP command was detected" |
| LN_IPV4_DESTINATION | 10.0.0.1 |
| | Event 2: |
| LN_SITUATION_ID | 999 |
| LN_SITUATION_STRING | "Too long SMTP command was detected" |
| LN_IPV4_DESTINATION | 10.0.0.15 |
| | Event 3: |
| LN_SITUATION_ID | 998 |
| LN_SITUATION_STRING | "Attempted connection refused" |
| LN_PORT_DESTINATION | 25 |
| LN_IPV4_DESTINATION | 10.0.0.1 |
| | Event 4: |
| LN_SITUATION_ID | 998 |
| LN_SITUATION_STRING | "Attempted connection refused" |
| LN_PORT_DESTINATION | 25 |
| LN_IPV4_DESTINATION | 10.254.0.5 |
| | Event 5: |
| LN_SITUATION_ID | 997 |
| LN_SITUATION_STRING | "Attempted unauthorized connection" |
| LN_IPV4_SOURCE | 10.0.0.254 |

Events 1, 3, and 5 fulfill the event sequence conditions described in the chapter Event sequence detection above, as can be seen by selecting $e_1$=Event 1, $e_2$=Event 3, and $e_3$=Event 5. Now we have $f_1(e_1)=f_2(e_2)=f_3(e_3)$=TRUE $b_{1,2}^1(e_1)$=10.0.0.1=$b_{1,2}^2(e_2)$ $b_{2,3}^2(e_2)$=10.0.0.0=$b_{2,3}^3(e_3)$ The detection can be implemented in a detector or analyser using, for example, a hash table for each stage of the event sequence, except for the final stage. The hash table may contain references to the events forming a unique (according to the binding function value) prefix of length 1 on stage 1, length 2 on stage 2, and so on. The key to the table is the value of $b_{1,2}^1$ on stage 1, $b_{2,3}^2$ on stage 2, and so on.

The following example illustrates how the hash tables are updated upon receiving the five events shown above. When the first event is received, the filters are evaluated, and it is found out that only $f_1$ evaluates to true, so the event is considered only for stage 1. The binding function $b_{1,2}^1$ is evaluated; its value is 10.0.0.1 (LN_IPV4_DESTINATION of the received event). There is no corresponding entry in the hash table of stage 1, so one is added:

| Stage 1: | |
|---|---|
| key | references |
| 10.0.0.1 | Event 1 |
| Stage 2: | |
| key | references |

Similarly, when Event 2 is received, another entry is added to the hash table of Stage 1:

| Stage 1: | |
|---|---|
| key | references |
| 10.0.0.1 | Event 1 |
| 10.0.0.15 | Event 2 |
| Stage 2: | |
| key | references |

When Event 3 is received, only $f_2$ evaluates to true, so only stage 2 is considered. Now it is first checked, whether there is an entry in the hash table of the previous stage (stage 1) with key $b_{1,2}^2$ (10.0.0.1). There is such entry (the first entry), and therefore, it is next checked whether there is already an entry in the hash table of stage 2 with key $b_{2,3}^2$. In this example, there is no such entry, and consequently, a new prefix is added:

| Stage 1: | |
|---|---|
| key | references |
| 10.0.0.1 | Event 1 |
| 10.0.0.15 | Event 2 |
| Stage 2: | |
| key | references |
| 10.0.0.0 | Event 1, Event 3 |

When Event 4 is received, $f_2$ evaluates to true, but on the other hand, there is no entry in the hash table of the previous stage with key $b_{1,2}^2$ (10.254.0.5), and therefore, a new prefix is not added and the tables remain unchanged.

When Event 5 is received, $f_3$ evaluates to true. As before, it is checked whether the hash table of the previous stage (stage 2) has an entry with key $b_{2,3}^3$ (10.0.0.0). Because there is an entry with that key, it is determined that a event sequence consisting of events Event 1, Event 3, and Event 5 is detected. The analyser or detector may send or provide a respective alarm or report, for example to the operator console.

The hash table entries may be removed from the tables when the first event that the entry refers to is old enough (i.e. outside the time window). This may be implemented simply by a linked list that contains a pointer to each hash table element. The list is kept sorted so that the element that will expire next is the first element on the list. If a corresponding entry already exists in the table when adding another prefix, the expiration time of the entry may be adjusted, if the new prefix has later expiration time than the prefix that was already in the table.

It should be appreciated that, although we have concentrated on detecting a single event sequence in the above examples, several event sequences can be detected concurrently by defining multiple event sequence detection functions in the analyzer, each having a set of filters and binding functions of its own.

Thus, while the present invention has been described with reference to specific examples, which are intended to be illustrative only and not to be limiting the invention, it will be apparent to those skilled in the art that changes, additions and deletions may be made to the disclosed embodiments without departing from the spirit and scope of the invention.

The invention claimed is:

1. An event sequence detection method, comprising
defining a sequence including two or more stages in order, each of the stages including one or more events,
defining a filtering function for each of said stages, each filtering function providing a TRUE indication, when one of the events belonging to the respective event is received, and a FALSE indication otherwise,
defining at least one binding function for each of the stages such that a pair of binding functions in two successive stages links the events in these two successive stages,
continuously receiving event data,
continuously evaluating the received event data with the filtering functions,
when the evaluation results in a TRUE indication from one of the filter functions, deriving at least one key value from the received event data by the corresponding at least one binding function,
determining that said sequence has been detected, when a TRUE indication has been obtained in each stage in a timely order and the derived key values link the detected events in the successive stages.

2. The method as claimed in claim 1, wherein said determining comprises determining that said sequence has been detected, when a TRUE indication has been obtained in each stage in a timely order and the derived key values link the detected events in the successive stages within a time window.

3. The method as claimed in claim 1 or 2, wherein said determining comprises
when the filter function that provided the TRUE indication is the filter function for the first stage, registering or updating the current event with the derived key value in said first stage,
when the filter function that provided the TRUE indication is the filter function for other than the first stage and a last stage in order in said sequence and there is a registration with one of the at least one derived key value in the previous stage in order in said sequence, registering or updating the current event or events with the at least one derived key value,
when the filter function that provided the TRUE indication is the filter function for the last stage in order in said sequence and there is a registration with one of the at least one derived key value in the previous stage in order in said sequence, determining that said event sequence has been detected.

4. The method as claimed in claim 2, comprising cancelling registered event and key value older than the time window based on time information or a time stamp.

5. The method as claimed in claim 4, wherein said updating comprises updating the time information or the time stamp of an already registered event and the associated at least one key value.

6. A computer readable storage medium comprising a computer program that carries out the method of claim 1 when executed by a computer.

7. A computer program that carries out the method of claim 1 when executed by a computer.

8. An event sequence detection method, comprising
defining a sequence including two or more stages in order, each of the stages including one or more events,
defining a filtering function for each of said stages, each filtering function providing a TRUE indication, when one of the events belonging to the respective event is received, and a FALSE indication otherwise,
evaluating the filtering functions with the event data,
if the filtering function of the one of the stages evaluates to TRUE, a binding function associated with the respective stage is evaluated for extracting a first key from the event data,
if the stage, which evaluates to TRUE, is the first stage, it is checked whether the event and the first key already exist in a table associated with the first stage, and the if checking result is negative, the event and the first key are added to the table,
if the stage, which evaluates to TRUE, is some other than the first stage, it is checked, whether there is an entry with the first key in the table of the previous stage, if the checking result is
negative, nothing is done, and if the checking result is confirmative, another binding function associated with the current stage is evaluated for extracting a second key from the event data and the table associated with the current stage is checked for whether the event and the second key do exist in the table, and if the latter checking result is negative, the event and the second key are added to the table,
if the stage, which evaluates to TRUE, is the last stage, it is checked, whether there is an entry with the first key in the table of the previous stage, and if the checking result is negative, nothing is done, and if the checking result is confirmative, it is determined that a sequence of events has been detected.

9. The method according to claim 8, comprising
providing the events in the tables with time information or time stamps,
updating the time information or the time stamp of the event, if the event to be added to a table already exists in the table,
cancelling an entry that is older than a time window.

10. A computer readable storage medium comprising a computer program that carries out the method of claim 8 when executed by a computer.

11. An event sequence detection method, comprising
defining a sequence including two or more events,
defining a filtering function and an associated binding function for each event, each filtering function providing a TRUE indication, when the respective event is received, and a FALSE indication otherwise,
continuously receiving event data,
continuously evaluating the received event data with the filtering functions,
each time when the evaluation results in a TRUE indication from one of the filter functions, registering the corresponding event and a key value derived from the received event data by the corresponding binding function,
determining the sequence as detected, if all events of the event sequence with mutually matching key values are registered within a time window.

12. A computer readable storage medium comprising a computer program that carries out the method of claim 11 when executed by a computer.

13. An event sequence detection method, comprising
defining a sequence including two or more stages, each of the stages including one or more events,
defining a filtering function for each of said stages, each filtering function providing a TRUE indication, when one of the events belonging to the respective event is received, and a FALSE indication otherwise,
evaluating the filtering functions with the event data,
if the filtering function of the one of the stages evaluates to TRUE, a binding function associated with the respective stage is evaluated for extracting a key from the event data,
checking whether the key already exists in a table associated with the set of stages,
if the key is not found in the table, the event with the key is added to the table,
if the key is found in the table, it is checked whether an event for the current stage is already recorded for the key,
if no event for the current stage is already recorded for the key, the event is added to the table in connection with the key and the current stage,
checking whether the key has an event recorded for each stage, and
if the key has an event recorded for each stage, determining that the sequence has been detected.

14. The method as claimed in claim 13, wherein said determining comprises determining that said sequence has been detected, when the key an event has an event recorded for each stage within a time window.

15. A computer readable storage medium comprising a computer program that carries out the method of claim 13 when executed by a computer.

16. An event sequence detection method, comprising
defining a sequence including two or more stages, each of the stages including one or more events,
defining a filtering function for each of said stages, each filtering function providing a TRUE indication, when one of the events belonging to the respective event is received, and a FALSE indication otherwise,
evaluating the filtering functions with the event data,
if the filtering function of the one of the stages evaluates to TRUE, a binding function associated with the respective stage is evaluated for extracting a key from the event data,
checking whether the key already exists in a table associated with the set of stages,
if the key is not found in the table, the event with the key is added to the table,
if the key is found in the table, it is checked whether an event for the current stage is already recorded for the key,
if no event for the current stage is already recorded for the key, the event is added to the table in connection with the key and the current stage,
if an event for the current stage is already recorded for the key, incrementing the number of events with this key and stage,
checking whether the key has a predetermined number of events recorded for each stage, and
if the key has a predetermined number of events recorded for each stage, determining that the event sequence has been detected.

17. A computer readable storage medium comprising a computer program that carries out the method of claim 16 when executed by a computer.

18. An event sequence detector block for execution by a processor in a data communications network environment, comprising:
a computer readable memory, and
a routine stored on the computer readable memory and adapted to be implemented on the processor, wherein the routine:
has a predefined sequence including two or more stages in order, each of the stages including one or more events,
has a predefined filtering function for each of said stages, each filtering function providing a TRUE indication, when one of the events belonging to the respective event is received, and a FALSE indication otherwise,
has at least one predefined binding function for each of the stages such that a pair of binding functions in two successive stages links the events in these two successive stages,
continuously receives event data,
continuously evaluates the received event data with the filtering functions,
when the evaluation results in a TRUE indication from one of the filter functions, derives at least one key value from the received event data by the corresponding at least one binding function,
determines that said sequence has been detected, when a TRUE indication has been obtained in each stage in a timely order and the derived key values link the detected events in the successive stages.

19. An event sequence detector block as claimed in claim 18, wherein said routine determines that said sequence has been detected, when a TRUE indication has been obtained in each stage in a timely order and the derived key values link the detected events in the successive stages within a time window.

20. An event sequence detector block as claimed in claim 18, wherein said routine determines the event sequence as detected, if all events of the event sequence with mutually matching key values are registered within a time window.

21. An event sequence detector block for execution by a processor in a data communications network environment, comprising:
a computer readable memory, and
a routine stored on the computer readable memory and adapted to be implemented on the processor, wherein the routine:
has a predefined event sequence including two or more events,
has a predefined filtering function and an associated binding function for each event, each filtering function providing a TRUE indication, when the respective event is received, and a FALSE indication otherwise,
continuously receives event data,
continuously evaluates the received event data with the filtering functions,
each time when the evaluation results in a TRUE indication from one of the filter functions, registers the corresponding event and a key value derived from the received event data by the corresponding binding function,
determines the sequence as detected, if all events of the sequence with mutually matching key values are registered.

* * * * *